Sept. 23, 1941.   H. WESTERKAMP   2,257,028
SOUND RECORDER FOR SOUND TAPES
Filed July 8, 1939
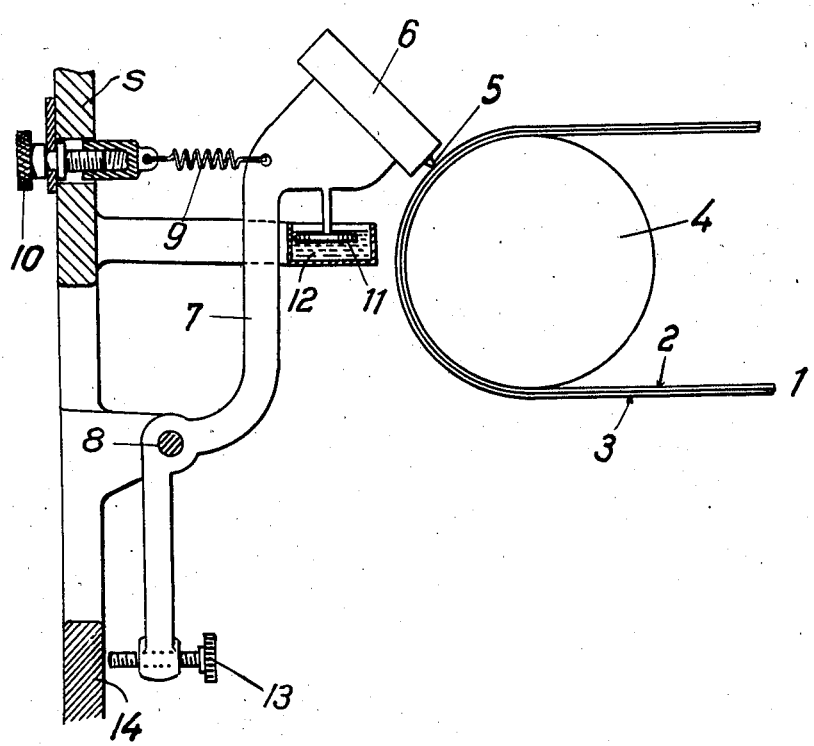
Inventor:
Hugo Westerkamp
By: Mason & Porter
Attorneys Patented Sept. 23, 1941

2,257,028

UNITED STATES PATENT OFFICE 2,257,028

SOUND RECORDER FOR SOUND TAPES

Hugo Westerkamp, Cologne-Braunsfeld, Germany

Application July 8, 1939, Serial No. 283,488
In Germany August 13, 1938

3 Claims. (Cl. 274—11)

The invention relates to an apparatus for cutting sound records mechanically in sound tapes by means of a recorder provided with a cutting stylus. The object of the invention is to provide an apparatus of this nature for producing high-grade sound recordings suitable for duplication.

It is known in sound-recording apparatus of the type concerned to relieve the recorder of load by means of an adjustable spring in order to obtain a predetermined cutting depth, while the recorder has been provided with a damping arrangement in order to prevent harmful oscillations of the oscillatory system formed by the spring and the recorder. Another known arrangement for limiting the cutting depth, which is employed instead of the aforesaid arrangement, is based upon the principle of limiting the penetration of the recorder, acting with its full weight on the recording layer of the sound band, by means of a stop for the recorder. Both systems are open to disadvantages.

It is true that the recorder constructed as an oscillatory system is capable of so damping down periodically occurring resonance oscillations that the cutting depth and consequently the sound volume are not substantially modified, but if the oscillatory system of the recorder is subjected to the action of oscillations of great amplitude or of oscillations of a frequency equal to or substantially equal to that of the oscillations of the recorder or to a harmonic oscillation of the recorder owing to irregularities in the material of the sound tape or external influences, such as vibrations or the like, the damping arrangement no longer keeps the oscillation or resonance oscillations of the recorder sufficiently small, so that considerable variation in the cutting depth occurs, which causes an undesirable modification of the sound volume in the reproduction of the sound band and may even be so great that the stylus penetrates into the hard carrier material of the sound tape and is destroyed.

In the known system for limiting the cutting depth, in which the recorder is held against a stop by its weight, the danger of penetration of the cutting stylus into the hard carrier layer of the sound band is avoided, but the system is unable to follow external oscillations of small amplitude owing to the great mass of the recorder.

The invention overcomes the disadvantages of both known systems while retaining the advantages thereof, and provides a sound-recording apparatus in which the recorder constructed as an oscillatory system is provided with an arrangement for positively limiting the amplitude of its resonance oscillations.

The invention is particularly advantageous when applied to apparatus in which the sound tape does not, as usual, pass over a stationary guide member during the sound recording, but lies on a rotating guide member forming a resonance system with the oscillatory system of the recorder, the oscillation frequency of the guide member being lower than the oscillation frequency of the oscillatory system of the recorder, while the said oscillatory system is provided with a damping arrangement.

The arrangement for positively limiting the amplitude of the resonance oscillations of the recorder consists preferably of a stop acting in the direction of the cutting depth of the stylus. The recorder does not come into contact with this stop during normal working of the sound-recording apparatus and even when periodical resonance oscillations are set up, for example by the rotating guide member of the sound-recording tape. It serves solely to limit the amplitude of those resonance oscillations which are caused by external oscillations of great amplitude or of critical frequency which are suddenly set up.

The drawing shows diagrammatically a construction of a sound-recording apparatus according to the invention.

The sound-recording tape 1 which consists of a carrier 2 of tape form and, for example, a thin wax layer 3, is passed over a circular path on a drum 4, which rotates at uniform speed and moves the sound-recording tape forward below the cutting stylus 5 of the recorder 6. The speed of the drum 4 is comparatively low and bears a predetermined relationship to the mass of the recorder.

The recorder 6 is oscillatably mounted at 8 on a lever arm 7 so that the action of gravity tends to move the recorder toward the tape. The recorder is suspended on a spring 9, the tension of which may be adjusted by an adjustment screw 10 on the support S. On the lower side of the lever arm 7 is mounted a disc 11 which dips into an oil-filled container 12 and serves to damp the oscillations of the oscillatory system formed by the recorder 6 and the spring 9. This container 12 may be carried by the support S.

The lever arm 7 is extended beyond the bearing 8 on the support S and carries at its lower end an adjustment screw 13 situated opposite a stop 14 mounted on the support S and extending parallel to the axis of the guide member 4, illustrated as a drum.

The spring 9 is so adjusted by the adjustment screw 10 that its elastic yield suspends the mass of the recorder and its supporting lever so that the cutting stylus of the recorder 6 penetrates to the desired depth into the easily-cut wax layer 5 of the sound-recording tape. The system comprising the recorder and the spring thus limits the cutting depth when there are no external influences.

The unavoidable periodical oscillations occurring during the rotation of the guide member 4 are imparted by the stylus 5 to the mechanical oscillatory system formed of the effective, predeterminable mass of the recorder and its supporting arm and of the predeterminable elasticity of the spring 9, and set up in this system resonance oscillations which are, however, so damped by the damping arrangement 11, 12 when the frequency of oscillation of the path 4 is lower than the frequency of oscillation of the oscillatory system of the recorder that they have no detrimental effect on the sound recording.

Matters are different when external oscillations of great amplitude or of critical frequency are suddenly set up, which may be caused, for example, by involuntary shocks in the drive of the recording apparatus, irregularities in the recording layer of the sound tape or by vibrations of the entire recording apparatus. These oscillations may reach a critical value which causes critical resonance oscillations in the oscillatory circuit of the recorder, as a result of which the stylus either penetrates so deeply into the wax layer that the sound volume fluctuates upon reproduction, or even penetrates so deeply into the sound tape that the stylus passes completely through the wax layer and enters the carrier of the tape form for the wax layer, where it is destroyed, which is particularly liable to occur when the point of the stylus consists of sapphire. It must here be borne in mind that the wax layer is only very thin and cannot be thickened as desired, because it would break off from the carrier.

According to the invention, the amplitude of the critical resonance oscillations of the oscillatory system of the recorder is positively limited by the stop 14. The adjustment screw 13 is so set that its point normally lies at such a distance from the stop 14, that, when there are no external influences and even when resonance oscillations are set up in the oscillatory circuit of the recorder 6 by the periodical oscillations of the guide member 4, it does not come into contact with the stop. However, if, owing to the external shocks, vibrations or the like, resonance oscillations are set up in the oscillatory circuit, the amplitude of which would exceed the permissible cutting depth of the stylus the point of the adjustment screw 13 bears against the stop 14 and thus limits the amplitude of oscillation and consequently the cutting depth of the stylus until the critical resonance oscillation has died down.

I claim:

1. Apparatus for cutting mechanical sound records in sound tape, comprising a sound recording device including a recorder having a stylus positioned for cutting the tape, a rotating member for guiding the tape past the stylus and imposing during its rotation periodic disturbances of a predetermined normal frequency upon the tape and stylus, a lever supporting said recorder and permitting gravitational movement thereof toward the tape, said recorder and supporting lever having a predetermined effective mass, and spring means connected to said lever and having a predetermined rate of elastic yield for resiliently suspending the lever at a normal cutting depth, said recorder and its lever and said spring means being constructed and arranged to constitute a mechanical oscillatory system composed of mass and elasticity and having a characteristic frequency of oscillation which is not less than the normal frequency of periodic disturbances exerted upon the stylus from the rotating member.

2. Apparatus for cutting mechanical sound records in sound tape having a hard carrier layer and an easily-cut surface layer, comprising a frame, a recorder having a stylus positioned for cutting the tape, a rotating member for guiding the tape past the stylus and imposing during its rotation periodic disturbances of a predetermined normal frequency upon the tape and stylus, a lever supporting said recorder and permitting gravitational movement thereof toward the tape, said recorder and supporting lever having a predetermined effective mass, spring means connected to said lever and having a predetermined rate of elastic yield for resiliently suspending the lever with the stylus normally engaged only in the said easily-cut surface layer of the tape, said recorder and its lever and said spring means constituting a mechanical oscillatory system composed of mass and elasticity and having a characteristic frequency of oscillation which is not less than the normal frequency of periodical disturbances exerted upon the stylus from the rotating member, and normally ineffective interengageable stop elements on said frame and lever for mechanically limiting the maximum amplitude of resonance oscillation of the lever and thereby positively preventing the stylus from penetrating through the said easily-cut layer into the hard carrier layer.

3. Apparatus for cutting mechanical sound records in sound tape, comprising a frame, a recorder having a stylus positioned for cutting the tape, a rotating member for guiding the tape past the stylus and imposing during its rotation periodic disturbances of a predetermined normal frequency upon the tape and stylus, a lever supporting said recorder and permitting gravitational movement thereof toward the tape, said recorder and supporting lever having a predetermined effective mass, spring means connected to the lever and having a predetermined rate of elastic yield for resiliently suspending the lever at a normal cutting depth, said recorder and its lever and said spring means constituting a mechanical oscillatory system composed of mass and elasticity and having a characteristic frequency of oscillation which is not less than the normal frequency of periodic disturbances exerted upon the stylus from the rotating members, and normally ineffective interengageable stop elements on said frame and lever for mechanically limiting the maximum amplitude of resonance oscillation of the lever when responding to disturbances of abnormally high frequency and to sudden shocks and thereby positively restricting the cutting depth of the stylus.

HUGO WESTERKAMP.